(12) United States Patent
Liu et al.

(10) Patent No.: US 12,476,018 B2
(45) Date of Patent: Nov. 18, 2025

(54) CONDUCTIVE CABLE FOR A BATTERY ELECTRIC VEHICLE

(71) Applicant: GM Global Technology Operations LLC, Detroit, MI (US)

(72) Inventors: Yi Liu, Troy, MI (US); Qigui Wang, Rochester Hills, MI (US); Huaxin Li, Rochester Hills, MI (US); Kestutis A. Sonta, Troy, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 422 days.

(21) Appl. No.: 18/322,211

(22) Filed: May 23, 2023

(65) Prior Publication Data

US 2024/0395438 A1    Nov. 28, 2024

(51) Int. Cl.
| | |
|---|---|
| *H01B 1/02* | (2006.01) |
| *H01B 1/04* | (2006.01) |
| *H01B 5/08* | (2006.01) |
| *B60L 53/18* | (2019.01) |

(52) U.S. Cl.
CPC ............ *H01B 1/026* (2013.01); *H01B 1/023* (2013.01); *H01B 1/04* (2013.01); *H01B 5/08* (2013.01); *B60L 53/18* (2019.02)

(58) Field of Classification Search
None
See application file for complete search history.

(56) References Cited

U.S. PATENT DOCUMENTS

| | | | | |
|---|---|---|---|---|
| 1,132,676 | A * | 3/1915 | Murray et al. | ............ F16L 9/18 174/97 |
| 2,132,235 | A * | 10/1938 | Green | .................... H01B 7/226 174/128.1 |
| 3,683,103 | A * | 8/1972 | Mancino | .............. H01B 7/0009 174/126.2 |

(Continued)

OTHER PUBLICATIONS

Cao, Mu; Ultrahigh Electrical Conductivity of Graphene Embedded in Metals; Advanced Functional Materials, www.afm-journal.de; 2019; 8 pages; 29, 1806792; Wiley-VCH Verlag GmbH & Co. KGaA, Weinheim.

(Continued)

*Primary Examiner* — Krystal Robinson
(74) *Attorney, Agent, or Firm* — Vivacqua Crane, PLLC

(57) ABSTRACT

A conductive cable for a battery electric vehicle is provided. The conductive cable comprises a plurality of first members in alignment to define a longitudinal axis of the conductive cable. Each first member comprises a first conductive wire about which a first outer layer is disposed for electric current to flow therethrough relative to the longitudinal axis. The first outer layer comprises a first metal substrate having a first side and an opposite second side. The first outer layer comprises a first copper-graphene (Cu-Gr) multilayer composite disposed on the first side and a second Cu-Gr multilayer composite disposed on the second side of the first metal substrate. Each first conductive wire comprises a first metallic material. The plurality of first members is disposed together along the longitudinal axis to define a cable bundle. The conductive cable further comprises a non-conductive layer disposed about the cable bundle.

20 Claims, 4 Drawing Sheets

(56) References Cited

U.S. PATENT DOCUMENTS

| | | | | |
|---|---|---|---|---|
| 4,568,797 | A * | 2/1986 | Binder | H01B 5/08 |
| | | | | 174/128.1 |
| 9,293,233 | B2 * | 3/2016 | Gazda | H01B 1/04 |
| 10,546,669 | B2 * | 1/2020 | Smathers | H10N 60/85 |
| 11,495,372 | B2 * | 11/2022 | Smathers | H10N 60/20 |
| 2005/0178472 | A1 * | 8/2005 | Hong | B21C 37/047 |
| | | | | 148/98 |
| 2011/0190139 | A1 * | 8/2011 | Ohata | H01B 12/04 |
| | | | | 29/599 |
| 2012/0108437 | A1 * | 5/2012 | Ohata | H10N 60/0184 |
| | | | | 505/231 |
| 2013/0053250 | A1 * | 2/2013 | Ohata | H10N 60/0184 |
| | | | | 505/231 |
| 2017/0309375 | A1 * | 10/2017 | Aimone | H10N 60/0156 |
| 2019/0267160 | A1 * | 8/2019 | Smathers | H10N 60/85 |
| 2020/0234847 | A1 * | 7/2020 | Suenaga | H05K 9/0098 |
| 2022/0199280 | A1 * | 6/2022 | Lekarski | H01B 1/026 |
| 2024/0421645 | A1 * | 12/2024 | Liu | H02K 3/12 |

OTHER PUBLICATIONS

Pan, Chaochao; Enhanced electrical conductivity in graphene-copper multilayer composite; AIP Advances 12; Oct. 14, 2021; 7 pages; 015310 (2022); AIP Publishing, published online: Jan. 6, 2022; https://doi.org/10.1063/5.0073879.

* cited by examiner

CONDUCTIVE CABLE FOR A BATTERY ELECTRIC VEHICLE

INTRODUCTION

The present disclosure relates to conductive cables for battery electric vehicles and, more particularly, conductive cables for battery electric vehicles wherein the conductive cables have wires coated with copper-graphene multilayer composites.

With increasing demand of fuel efficiency and particularly reduction of greenhouse gas emissions, today's automotive industry has begun a new era of manufacturing environmentally friendly zero-emission vehicles such as battery electric vehicles. Current challenges are met to increase electric power density and lower energy consumption.

SUMMARY

Thus, while current conductive cables for electric battery vehicles achieve their intended purpose, there is a need for a new and improved conductive cable for a battery electric vehicle to increase electric power density and lower energy consumption.

In accordance with one aspect of the present disclosure, a conductive cable for a battery electric vehicle is provided. The conductive cable comprises a plurality of first members in alignment to define a longitudinal axis of the conductive cable. Each first member comprises a first conductive wire about which a first outer layer is disposed for electric current to flow therethrough relative to the longitudinal axis.

In this aspect, the first outer layer comprises a first metal substrate having a first side and an opposite second side. The first outer layer further comprises a first copper-graphene (Cu-Gr) multilayer composite disposed on the first side and a second Cu-Gr multilayer composite disposed on the second side of the first metal substrate. Each first conductive wire comprises a first metallic material. The plurality of first members is disposed together along the longitudinal axis to define a cable bundle.

According to this aspect, the conductive cable further comprises a non-conductive layer disposed about the cable bundle to define the conductive cable.

In one embodiment, the first metal substrate has a thickness of between 5 microns and 25 microns. In another embodiment, the first metal substrate comprises one of copper, aluminum, carbon steel and stainless steel. In yet another embodiment, each of the first and second Cu-Gr multilayer composites comprises at least two Cu-Gr layers. Moreover, each Cu-Gr layer comprises copper and graphene and has a thickness of between 0.1 micron and 0.5 micron.

In another embodiment, each of the first and second Cu-Gr multilayer composites has a thickness of between 0.2 micron to 200 micron. In yet another embodiment, each of the first and second Cu-Gr multilayer composites has a graphene volume fraction of 0.002% to 0.2%. In still another embodiment, the first metallic material is copper.

In another embodiment, the conductive cable further comprises at least one second member in alignment with the plurality of first members along the longitudinal axis. The at least one second member comprises a second conductive wire about which a second outer layer is disposed for electric current to flow therethrough relative to the longitudinal axis. The second outer layer comprises a second metal substrate having a first side and an opposite second side.

In this embodiment, the second outer layer comprises a third copper-graphene (Cu-Gr) multilayer composite disposed on the first side of the second metal substrate and a fourth Cu-Gr multilayer composite disposed on the second side of the second metal substrate. Each second conductive wire comprises one of aluminum and steel. The at least one second member is disposed together with the plurality of first members along the longitudinal axis defining the cable bundle.

In one embodiment, the second metal substrate has a thickness of between 5 microns and 25 microns. In another embodiment, the second metal substrate comprises one of copper, aluminum, carbon steel and stainless steel. In yet another embodiment, each of the third and fourth Cu-Gr multilayer composites comprises at least two Cu-Gr layers. Moreover, each Cu-Gr layer of the third and fourth Cu-Gr multilayer comprises copper and graphene and has a thickness of 0.1 micron and 0.5 micron.

In another embodiment, the third and fourth Cu-Gr multilayer composites has a thickness of 0.2 micron to 200 micron. In yet another embodiment, each of the third and fourth Cu-Gr multilayer composites has a graphene volume fraction of 0.002% to 0.2%.

In accordance with another aspect of the present disclosure, a conductive cable for a battery electric vehicle is provided. The conductive cable comprises a plurality of first members in alignment to define a longitudinal axis of the conductive cable. Each first member comprises a first conductive wire about which a first outer layer is disposed for electric current to flow therethrough relative to the longitudinal axis.

In this aspect, the first outer layer comprises a first metal substrate having a first side and an opposite second side. The first outer layer comprises a first copper-graphene (Cu-Gr) multilayer composite disposed on the first side and a second Cu-Gr multilayer composite disposed on the second side of the first metal substrate. Each first conductive wire comprises one of copper and aluminum. The plurality of first members is disposed together along the longitudinal axis to define a cable bundle.

According to this aspect, the conductive cable further comprises at least one second member in alignment with the plurality of first members along the longitudinal axis. The at least one second member comprises a second conductive wire about which a second outer layer is disposed for electric current to flow therethrough relative to the longitudinal axis. The second outer layer comprises a second metal substrate having a first side and an opposite second side.

In this aspect, the second outer layer comprises a third copper-graphene (Cu-Gr) multilayer composite disposed on the first side of the second metal substrate and a fourth Cu-Gr multilayer composite disposed on the second side of the second metal substrate. Each second conductive wire comprises steel. The at least one second member is disposed together with the plurality of first members along the longitudinal axis defining the cable bundle.

Further to this aspect, the conductive cable further comprises a non-conductive layer disposed about the cable bundle to define the conductive cable.

In one embodiment of this aspect, each of the first and second metal substrates has a thickness of between 5 microns and 25 microns. In another embodiment, each of the first and second metal substrates comprises one of copper, aluminum, carbon steel and stainless steel. In yet another embodiment, each of the first, second, third, and fourth Cu-Gr multilayer composites comprises at least two Cu-Gr layers. Moreover, each Cu-Gr layer comprises copper and graphene and has a thickness of between 0.1 micron and 0.5 micron.

In another embodiment, each of the each of the first, second, third, and fourth Cu-Gr multilayer composites has a thickness of between 0.2 micron to 200 micron. In still another embodiment, each of the first, second, third, and fourth Cu-Gr multilayer composites has a graphene volume fraction of 0.002% to 0.2%.

In accordance with yet another aspect of the present disclosure, a conductive cable for a battery electric vehicle is provided. The conductive cable comprises a plurality of first members in alignment to define a longitudinal axis of the conductive cable. Each first member comprises a first conductive wire about which a first outer layer is disposed for electric current to flow therethrough relative to the longitudinal axis.

In this aspect, the first outer layer comprises a first copper-graphene (Cu-Gr) multilayer composite. Each first conductive wire comprises a first metallic material. The plurality of first members is disposed together along the longitudinal axis.

Further to this aspect, the conductive cable comprises at least one second member in alignment with the plurality of first members along the longitudinal axis. The at least one second member comprises a second conductive wire about which a second outer layer is disposed for electric current to flow therethrough relative to the longitudinal axis.

The second outer layer comprises a second copper-graphene (Cu-Gr) multilayer composite. Each second conductive wire comprises one of copper, aluminum, and steel. The at least one second member is disposed together with the plurality of first members along the longitudinal axis defining a cable bundle. Furthermore, the conductive cable comprises a non-conductive layer disposed about the cable bundle to define a conductive cable.

In one embodiment, each of the first and second Cu-Gr multilayer composites comprises at least two Cu-Gr layers, and wherein each Cu-Gr layer comprises copper and graphene and has a thickness of between 0.1 micron and 0.5 micron. In another embodiment, each of the each of the first and second Cu-Gr multilayer composites has a thickness of between 0.2 micron to greater than 200 microns. Moreover, each of the first and second Cu-Gr multilayer composites has a graphene volume fraction of 0.002% to 3%.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure provide a conductive cable for a battery electric vehicle. The conductive cable comprises a plurality of first members, each of which comprises a first conductive wire (e.g., copper wire) about which a first outer layer is disposed for electric current to operatively flow therethrough. The first outer layer comprises a first metal substrate (e.g., copper) disposed between first and second copper-graphene multilayer composites. Applications of the first outer layer provide a conductivity advantage due to the "skin effect" of electron transport. That is, the skin effect is a phenomenon whereby alternating electric current does not flow uniformly with respect to the cross-section of a conductive element, such as a wire. Current density of the conductive element (such as a copper wire) is highest near the surface thereof and decreases exponentially as distance from the surface increases. Thus, when the first and second multilayer composites are coated or bonded about the first conductive wire, an advantage of the relatively high conductivity of the multilayer composites can be utilized due to the skin effect of electron transport in high frequency applications.

Figure 1:
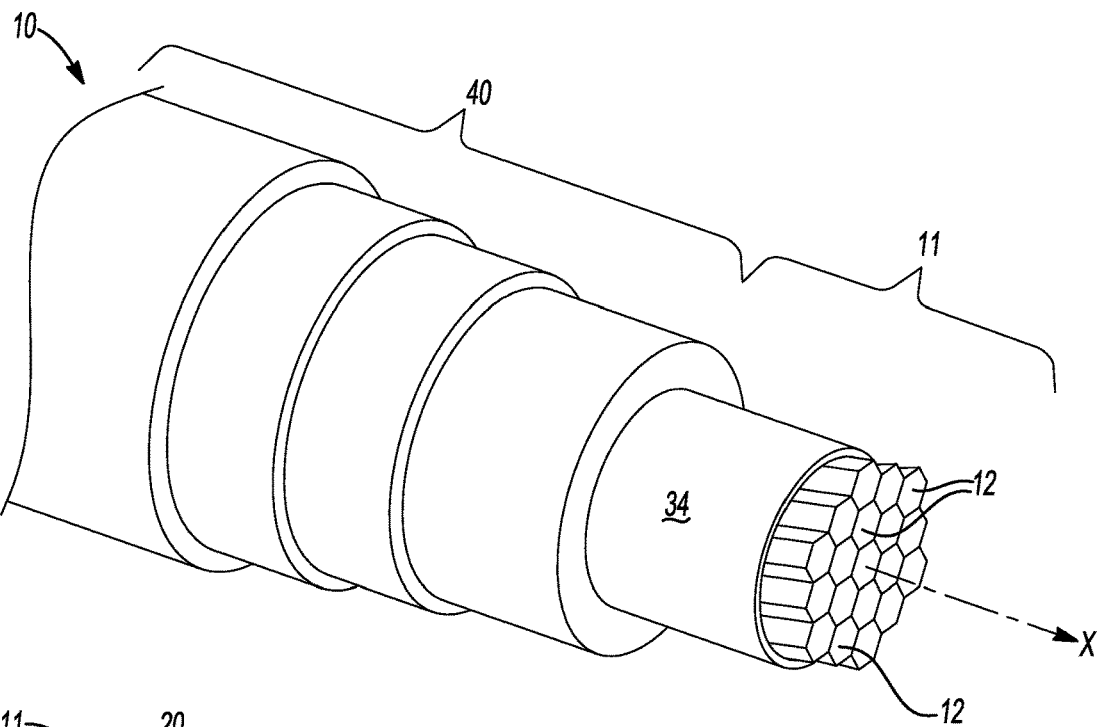
FIG. 1 is a side view of a conductive cable in accordance with one embodiment of the present disclosure.
Figure 2:
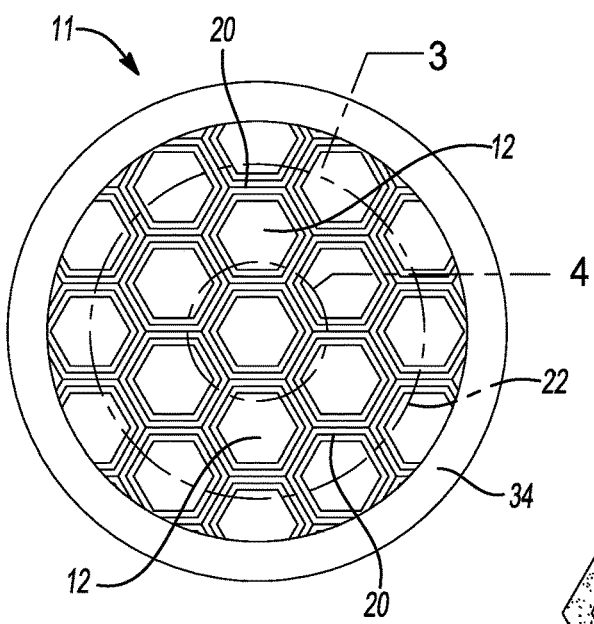
FIG. 2 is a cross-sectional end view of the conductive cable in FIG. 1.

FIG. 1 illustrates an assembly 10 comprising a conductive cable 11 for a battery electric vehicle in accordance with one embodiment of the present disclosure. As shown in FIGS. 1-2, the conductive cable 11 comprises a plurality of first members 12. In this embodiment, the first members 12 are arranged in alignment with each other to define a longitudinal axis of the conductive cable 11. Moreover, each first member 12 may be formed of any suitable cross-sectional shape such as a hexagonal shape. However, it is understood that each first member 12 may be formed of a circular shape, a rectangular shape, an octagonal shape or any other suitable shape without departing from the scope or spirit of the present disclosure.

Figure 3:
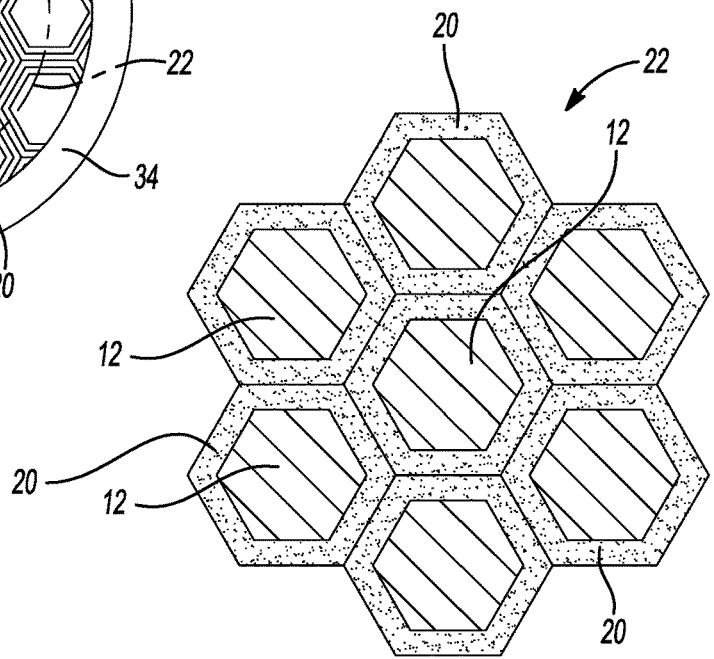
FIG. 3 is an enlarged view of a plurality of first members of the conductive cable in circle 3 of FIG. 2.
Figure 4:
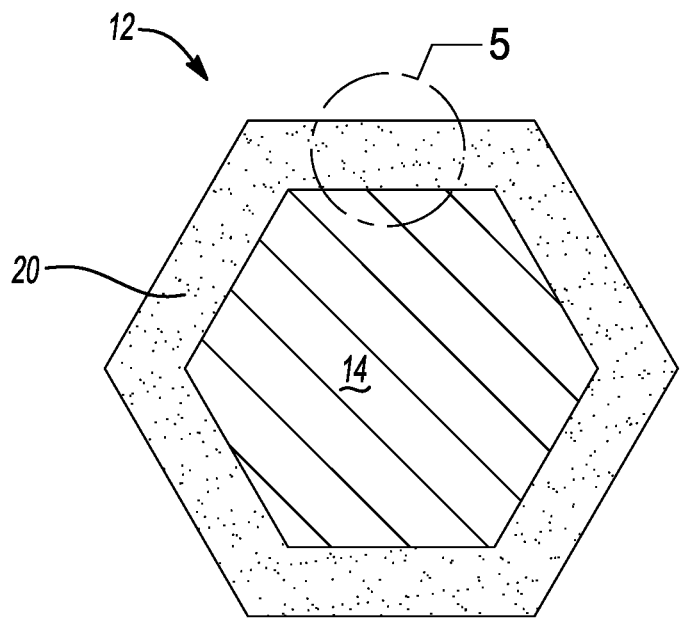
FIG. 4 is an enlarged view of one of the plurality of first members in circle 4 of FIG. 2.

As depicted in FIGS. 2-4, each first member 12 comprises a first conductive wire 14 about which a first outer layer 20 is disposed by any suitable manner for electric current to operatively flow therethrough relative to the longitudinal axis. Each first conductive wire 14 comprises a first metallic material. In this embodiment, the first metallic material is preferably comprised of copper. However, the first metallic material may comprise aluminum, low carbon steel, or any other suitable conductive material without departing from the spirit or scope of the present disclosure. Furthermore, the plurality of first members 12 is disposed together along the longitudinal axis to define a cable bundle 22.

Figure 5:
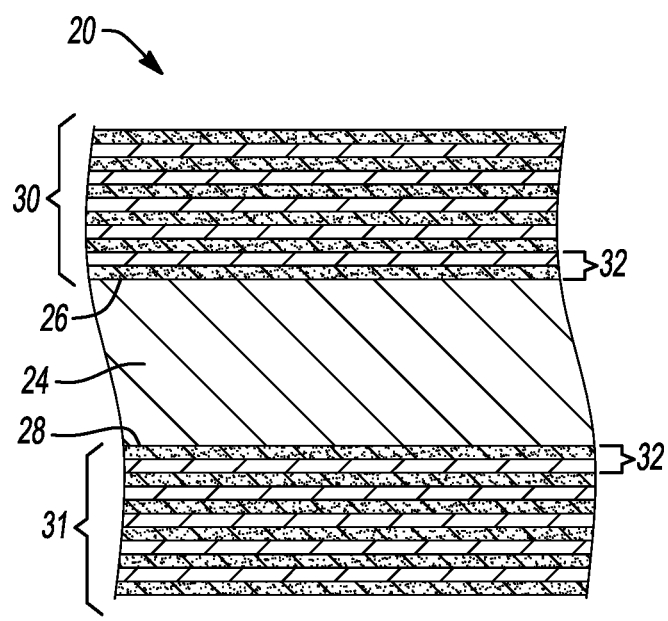
FIG. 5 is an enlarged cross-sectional view of a first outer layer of the first member in circle 5 of FIG. 4.

Referring to FIGS. 4-5, the first outer layer 20 comprises a first metal substrate 24 (e.g., a metallic foil such as copper foil) having a first side 26 and an opposite second side 28.

In one embodiment, the first metal substrate 24 has a thickness of between 5 microns and 25 microns. Preferably, the first metal substrate 24 may have a thickness of 6 microns, 7 microns, 8 microns, 9 microns, 10 microns, 11 microns, 12 microns, 13 microns, 14 microns, 15 microns, 16 microns, 17 microns, 18 microns, 19 microns, 20 microns, 21 microns, 22 microns, 23 microns, and 24 microns. Furthermore the first metal substrate 24 may comprise one of copper, aluminum, carbon steel, and stainless steel.

In this embodiment, the first outer layer 20 further comprises a first copper-graphene (Cu-Gr) multilayer composite 30 disposed by any suitable manner on the first side 26 and a second Cu-Gr multilayer composite 31 disposed on the second side 28 of the first metal substrate 24. Moreover, each of the first and second Cu-Gr multilayer composites 30, 31 comprises at least two Cu-Gr layers 32, preferably six or more Cu-Gr layers 32. It is to be understood that the first and second Cu-Gr multilayers may comprise a number of Cu-Gr layers 32 including 7, 8, 9, 10, 15, 20, 25, 30, 35, 40, 45, 50, 55, 60, 65, 70, 75, 80, 85, 90, 95, and 100 Cu-Gr layers 32.

Moreover, each Cu-Gr layer of the first and second Cu-Gr multilayer composites 30, 31 comprises copper and graphene and has a thickness of between 0.1 micron and 0.5 micron. Preferably, each Cu-Gr layer may have a thickness of 0.2 micron, 0.3 micron, and 0.4 micron. Additionally, each of the first and second Cu-Gr multilayer composites 30, 31 has a thickness of 0.2 micron to 200 micron, preferably 1.3 micron. Preferably, each of the first and second multilayer composites 30, 31 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, and 175 microns.

Furthermore, each of the first and second Cu-Gr multilayer composites 30, 31 has a graphene volume fraction of 0.002% to 0.2%. Preferably, each of the first and second Cu-Gr multilayer composites 30, 31 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%.

It is to be understood that each of the first and second Cu-Gr multilayer composites 30, 31 may be made by any suitable manner without departing from the spirit or scope of the present disclosure. For example, the Cu-Gr layers 32 may be disposed on the first metal substrate 24 by modulating a graphene layer on the first metal substrate 24 using chemical vapor deposition (CVD) or physical vapor deposition (PVD) and modulating a copper layer using electron beam deposition (EBD) on the graphene layer. On the copper layer, alternating graphene layers and copper layers may then be modulated thereon by way of CVD and EBD, respectively. Other ways of making the first and second Cu-Gr multilayer composites 30, 31 may be implemented without departing from the spirit or scope of the present invention.

Referring back to FIGS. 1-2, the conductive cable 11 further comprises a non-conductive layer 34 disposed about the cable bundle 22 to define the conductive cable 11. As shown in FIG. 1, the assembly 10 further comprises a connector housing 40 (here, a male connector end) that may be arranged about the conductive cable 11 for protection and purposes of connecting to a female connector end (not shown). It is to be understood that the assembly 10 may be arranged to have a female connector end or any other suitable arrangement without departing from the spirit or scope of the present disclosure.

It is to be understood that the conductive cable 11 may be implemented in any suitable high voltage/frequency applications. For example, the conductive cable 11 may be implemented in a charge system for charging a battery electric vehicle (BEV) wherein the conductive cable 11 may electrically connect a charge unit to a BEV for high voltage charging. Other suitable applications may implement the conductive cable without departing from the scope or spirit of the present disclosure.

Figure 6A:
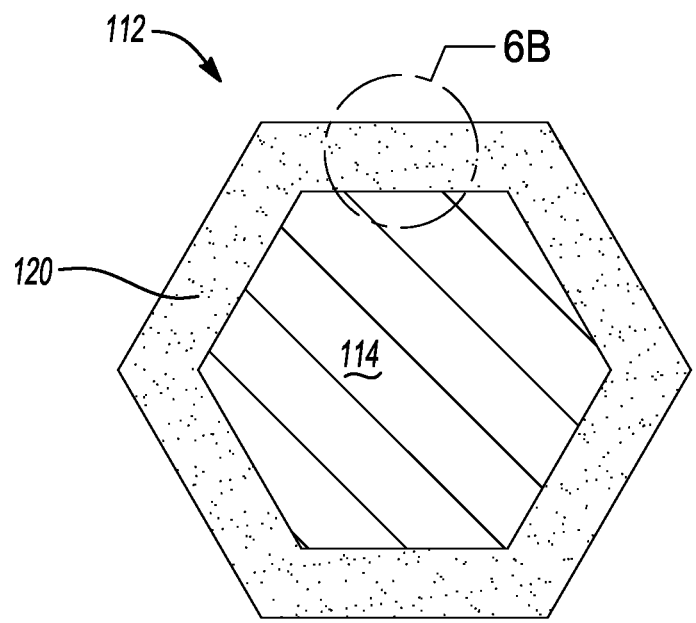
FIG. 6A is a cross-sectional view of one of a plurality of first members in accordance with another embodiment of the present disclosure.
Figure 6B:
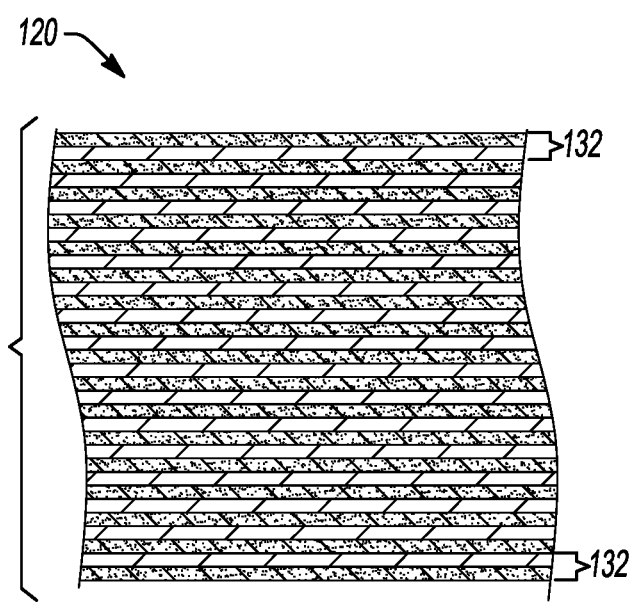
FIG. 6B is an enlarged cross-sectional view of a first outer layer in circle 6B of FIG. 6A.

FIGS. 6A-6B illustrate a first outer layer 120 of a first member 112 in accordance with another embodiment of the present disclosure. In this embodiment, the first outer layer 120 comprises a plurality of Cu-Gr layers 132 only and may be implemented similarly to the first outer layer 120 in the previous embodiment. That is, the first outer layer 120 having the plurality of Cu-Gr layers 132 only is disposed about a respective first conductive wire 114 similar to the first outer layer 20 disposed about the first conductive wire 14 in FIGS. 2-4.

As shown in FIGS. 6A-6B, the first outer layer 120 of first member 112 may comprise at least two Cu-Gr layers 132 wherein each Cu-Gr layer comprises copper and graphene. It is to be understood that the first outer layer 120 of this embodiment may comprise a number of Cu-Gr layers 132 including 7, 8, 9, 10, 15, 20, 25, 30, 35, 40, 45, 50, 55, 60, 65, 70, 75, 80, 85, 90, 95, 100, 150, 200, 250, 300, 350, 400, 450, and greater than 500 Cu-Gr layers 132. Moreover, each Cu-Gr layer has a thickness of 0.1 micron and 0.5 micron. Preferably, each Cu-Gr layer may have a thickness of 0.2 micron, 0.3 micron, and 0.4 micron.

In this embodiment, the first outer layer 120 has a thickness of 0.2 micron to greater than 200 microns. Preferably, the first outer layer 120 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, 175 microns, 225 microns, 250 microns, 300 microns, 400 microns, 500 microns, and 550 microns or more. Furthermore, the first outer layer 120 may have a graphene volume fraction of 0.002% to 3%. Preferably, the first outer layer 120 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%, 0.25%, 0.3%, 0.4%, 0.5%, 0.6%, 0.7%, 0.8%, 0.9%, 1%, 1.5%, 2%, 2.5% or higher.

Figure 7:
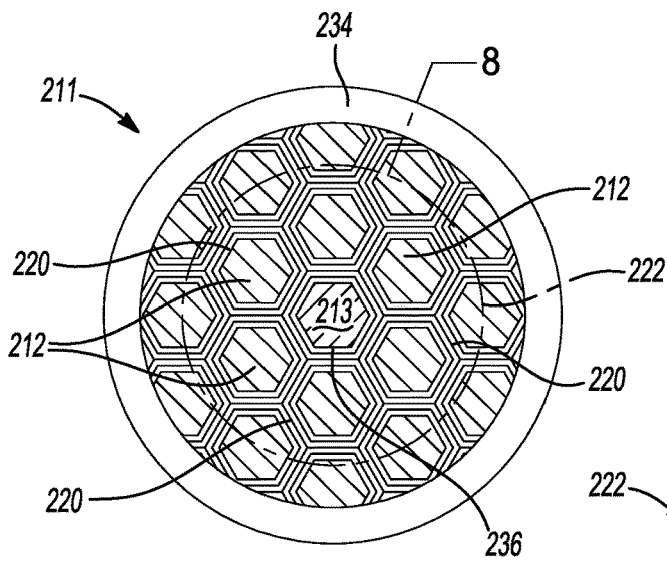
FIG. 7 is a cross-sectional end view of the conductive cable of FIG. 1 in accordance with another embodiment of the present disclosure.
Figure 8:
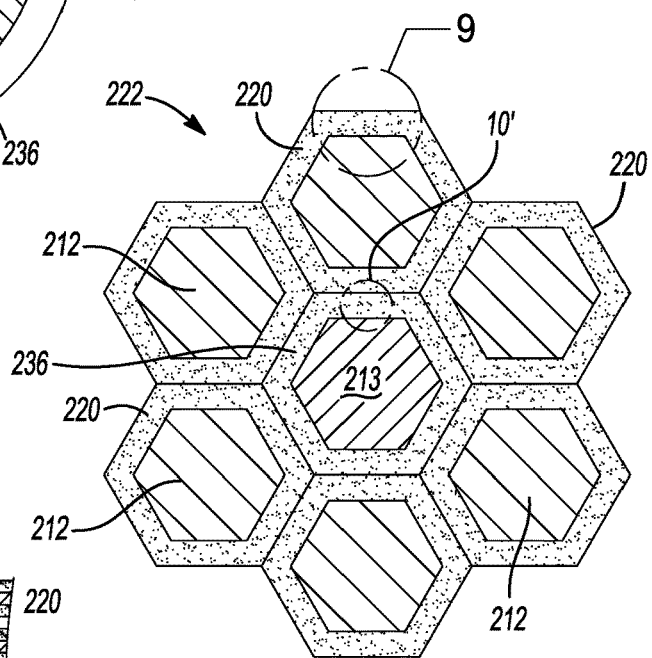
FIG. 8 is an enlarged view of a plurality of first members and a second member of the conductive cable in circle 8 of FIG. 7.

FIG. 7 illustrates a conductive cable 211 for a battery electric vehicle in accordance with another embodiment of the present disclosure. As shown in FIGS. 7-8, the conductive cable 211 comprises a plurality of first members 212 and at least one second member 213 wherein the second member 213 comprises material different than the plurality of first members 212. In this embodiment, the first members 212 are arranged in alignment with the second member 213 to define a longitudinal axis of the conductive cable 211.

As depicted in FIG. 8, each first member 212 comprises a first conductive wire 214 about which a first outer layer 220 is disposed for electric current to operatively flow therethrough relative to the longitudinal axis. Each first conductive wire 214 comprises a first metallic material. In this embodiment, the first metallic material is preferably comprised of copper. However, the first metallic material may comprise aluminum, low carbon steel, or any other suitable conductive material without departing from the spirit or scope of the present disclosure. Furthermore, the plurality of first members 212 is disposed together with the second member 213 along the longitudinal axis to define a cable bundle 222.

Figure 9:
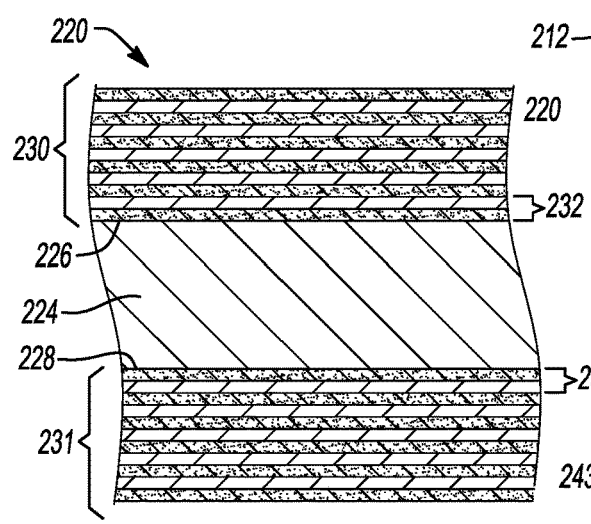
FIG. 9 is an enlarged cross-sectional view of a first outer layer of the first member in circle 9 of FIG. 8.

Referring to FIGS. 8-9, the first outer layer 220 comprises a first metal substrate 224 having a first side 226 and an opposite second side 228. In one embodiment, the first metal substrate 224 has a thickness of between 5 microns and 25 microns. Preferably, the first metal substrate 224 may have a thickness of 6 microns, 7 microns, 8 microns, 9 microns, 10 microns, 11 microns, 12 microns, 13 microns, 14 microns, 15 microns, 16 microns, 17 microns, 18 microns, 19 microns, 20 microns, 21 microns, 22 microns, 23 microns, and 24 microns. Furthermore the first metal substrate 224 may comprise one of copper, aluminum, carbon steel, and stainless steel.

In this embodiment, the first outer layer 220 further comprises a first copper-graphene (Cu-Gr) multilayer composite 230 disposed on the first side 226 and a second Cu-Gr multilayer composite 231 disposed on the second side 228 of the first metal substrate 224. Moreover, each of the first and second Cu-Gr multilayer composites 230, 231 comprises at least two Cu-Gr layers 232, preferably six or more Cu-Gr layers 232. It is to be understood that the first and second Cu-Gr multilayers may comprise a number of Cu-Gr layers 232 including 7, 8, 9, 10, 15, 20, 25, 30, 35, 40, 45, 50, 55, 60, 65, 70, 75, 80, 85, 90, 95, and 100 Cu-Gr layers 232.

Moreover, each Cu-Gr layer of the first and second Cu-Gr multilayer composites 230, 231 comprises copper and graphene and has a thickness of between 0.1 micron and 0.5 micron. Preferably, each Cu-Gr layer may have a thickness of 0.2 micron, 0.3 micron, and 0.4 micron. Additionally, each of the first and second Cu-Gr multilayer composites 230, 231 has a thickness of 0.2 micron to 200 micron, preferably 1.3 micron. Preferably, each of the first and second multilayer composites 230, 231 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, and 175 microns.

Furthermore, each of the first and second Cu-Gr multilayer composites 230, 231 has a graphene volume fraction of 0.002% to 0.2%. Preferably, each of the first and second Cu-Gr multilayer composites 230, 231 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%.

Referring back to FIG. 7, the conductive cable 211 further comprises at least one second member 213 in alignment with the plurality of first members 212 along the longitudinal axis. As depicted in FIGS. 7-8, the at least one second member 213 comprises a second conductive wire 234 about which a second outer layer 236 is disposed for electric current to flow therethrough relative to the longitudinal axis. The second conductive wire 234 comprises a second metallic material. In this embodiment, the second metallic material is different than the first metallic material and preferably comprised of aluminum or steel. However, the second metallic material may comprise copper, low carbon steel, or any other suitable conductive material different than the first metallic material without departing from the spirit or scope of the present disclosure. Furthermore, the at least one second member 213 is disposed with the plurality of first members 212 along the longitudinal axis to define the cable bundle 222.

Figure 10:
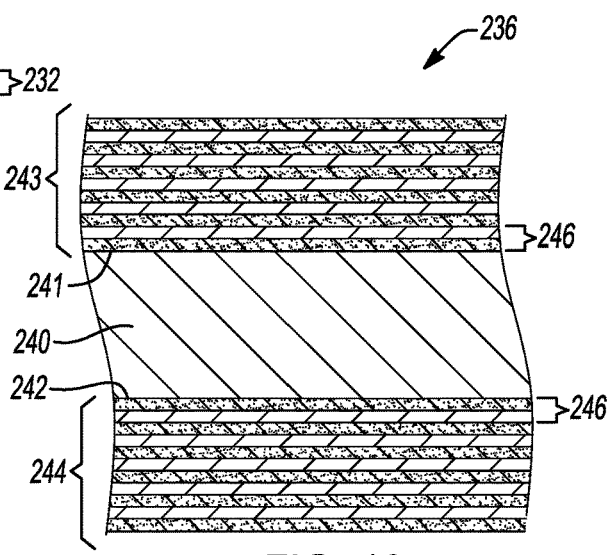
FIG. 10 is an enlarged cross-sectional view of a second outer layer of the second member in circle 10' of FIG. 8.

As illustrated in FIGS. 7-8 and 10, the second outer layer 236 comprises a second metal substrate 240 having a first side 241 and an opposite second side 242, similar to the first metal substrate 24 discussed above. In one embodiment, the second metal substrate 240 has a thickness of between 5 microns and 25 microns. Preferably, the second metal substrate 240 may have a thickness of 6 microns, 7 microns, 8 microns, 9 microns, 10 microns, 11 microns, 12 microns, 13 microns, 14 microns, 15 microns, 16 microns, 17 microns, 18 microns, 19 microns, 20 microns, 21 microns, 22 microns, 23 microns, and 24 microns. Furthermore the second metal substrate 240 may comprise one of copper, aluminum, carbon steel, and stainless steel.

In this embodiment, the second outer layer 236 further comprises a third copper-graphene (Cu-Gr) multilayer composite 243 disposed on the first side 241 and a fourth Cu-Gr multilayer composite 244 disposed on the second side 242 of the second metal substrate 240. Moreover, each of the third and fourth Cu-Gr multilayer composites 243, 244 comprises at least two Cu-Gr layers 246, preferably six or more Cu-Gr layers 246. It is to be understood that the third and fourth Cu-Gr multilayers may comprise a number of Cu-Gr layers 246 including 7, 8, 9, 10, 15, 20, 25, 30, 35, 40, 45, 50, 55, 60, 65, 70, 75, 80, 85, 90, 95, and 100 Cu-Gr layers 246.

Moreover, each Cu-Gr layer of the third and fourth second Cu-Gr multilayer composites 243, 244 comprises copper and graphene and has a thickness of between 0.1 micron and 0.5 micron. Preferably, each Cu-Gr layer may have a thickness of 0.2 micron, 0.3 micron, and 0.4 micron. Additionally, each of the third and fourth Cu-Gr multilayer composites 243, 244 has a thickness of 0.2 micron to 200 micron, preferably 1.3 micron. Preferably, each of the third and fourth multilayer composites 243, 244 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, and 175 microns.

Furthermore, each of the third and fourth Cu-Gr multilayer composites 243, 244 has a graphene volume fraction of 0.002% to 0.2%. Preferably, each of the third and fourth Cu-Gr multilayer composites 243, 244 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%.

Referring back to FIG. 7, the conductive cable 211 further comprises a non-conductive layer 248 disposed about the cable bundle 222 to define the conductive cable 211.

It is to be understood that each of the first, second, third, and fourth Cu-Gr multilayer composites 230, 231, 243, 244 may be made by any suitable manner without departing from the spirit or scope of the present disclosure. For example, the Cu-Gr layers 246 may be disposed on the each of first and second metal substrates 224, 240 by modulating a graphene layer on the metal substrate using chemical vapor deposition (CVD) and modulating a copper layer using electron beam deposition (EBD) on the graphene layer. On the copper layer, alternating graphene layers and copper layers may then be modulated thereon by way of CVD and EBD, respectively. Other ways of making the first, second, third, and fourth multilayer composites 230, 231, 243, 244 may be implemented without departing from the spirit or scope of the present invention.

It is to be understood that the conductive cable 211 may be implemented in various high voltage/frequency applications. For example, the conductive cable 211 may be implemented in a charge system for charging a battery electric vehicle (BEV) wherein the conductive cable 211 may electrically connect a charge unit to a BEV for high voltage charging. Other suitable applications may implement the conductive cable 211 without departing from the scope or spirit of the present disclosure.

Moreover, each of the first and second members 212, 213 may be formed of any suitable cross-sectional shape such as a hexagonal shape. However, it is understood that each of the first and second members 212, 213 may be formed of a circular shape, a rectangular shape, an octagonal shape or any other suitable shape without departing from the scope or spirit of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A conductive cable for a battery electric vehicle, the conductive cable comprising:
    a plurality of first members in alignment to define a longitudinal axis of the conductive cable, each first member comprising a first conductive wire about which a first outer layer is disposed for electric current to flow therethrough relative to the longitudinal axis, the first outer layer comprising a first metal substrate having a first side and an opposite second side, the first outer layer comprising a first copper-graphene (Cu-Gr) multilayer composite disposed on the first side and a second Cu-Gr multilayer composite disposed on the second side of the first metal substrate, each first conductive wire comprising a first metallic material, the plurality of first members being disposed together along the longitudinal axis to define a cable bundle; and
    a non-conductive layer disposed about the cable bundle to define the conductive cable.

2. The conductive cable of claim 1 wherein the first metal substrate has a thickness of between 5 microns and 25 microns.

3. The conductive cable of claim 1 wherein the first metal substrate comprises one of copper, aluminum, carbon steel and stainless steel.

4. The conductive cable of claim 1 wherein each of the first and second Cu-Gr multilayer composites comprises at least two Cu-Gr layers, and wherein each Cu-Gr layer comprises copper and graphene and has a thickness of between 0.1 micron and 0.5 micron.

5. The conductive cable of claim 1 wherein each of the first and second Cu-Gr multilayer composites has a thickness of between 0.2 micron to 200 micron.

6. The conductive cable of claim 1 wherein each of the first and second Cu-Gr multilayer composites has a graphene volume fraction of 0.002% to 0.2%.

7. The conductive cable of claim 1 wherein the first metallic material is copper.

8. The conductive cable of claim 1 further comprising:
    at least one second member in alignment with the plurality of first members along the longitudinal axis, the at least one second member comprising a second conductive wire about which a second outer layer is disposed for electric current to flow therethrough relative to the longitudinal axis, the second outer layer comprising a second metal substrate having a first side and an opposite second side, the second outer layer comprising a third copper-graphene (Cu-Gr) multilayer composite disposed on the first side of the second metal substrate and a fourth Cu-Gr multilayer composite disposed on the second side of the second metal substrate, each second conductive wire comprising one of aluminum and steel, the at least one second member being disposed together with the plurality of first members along the longitudinal axis defining the cable bundle.

9. The conducive cable of claim 8 wherein the second metal substrate has a thickness of between 5 microns and 25 microns.

10. The conducive cable of claim 8 wherein the second metal substrate comprises one of copper, aluminum, carbon steel and stainless steel.

11. The conducive cable of claim 8 wherein each of the third and fourth Cu-Gr multilayer composites comprises at least two Cu-Gr layers, and
    wherein each Cu-Gr layer of the third and fourth Cu-Gr multilayer comprises copper and graphene and has a thickness of 0.1 micron and 0.5 micron.

12. The conducive cable of claim 8 wherein each of the third and fourth Cu-Gr multilayer composites has a thickness of 0.2 micron to 200 micron.

13. The conducive cable of claim 8 wherein each of the third and fourth Cu-Gr multilayer composites has a graphene volume fraction of 0.002% to 0.2%.

14. A conductive cable for a battery electric vehicle, the conductive cable comprising:
    a plurality of first members in alignment to define a longitudinal axis of the conductive cable, each first member comprising a first conductive wire about which a first outer layer is disposed for electric current to flow therethrough relative to the longitudinal axis, the first outer layer comprising a first metal substrate having a first side and an opposite second side, the first outer layer comprising a first copper-graphene (Cu-Gr) multilayer composite disposed on the first side and a second Cu-Gr multilayer composite disposed on the second side of the first metal substrate, each first conductive wire comprising one of copper and aluminum, the plurality of first members being disposed together along the longitudinal axis to define a cable bundle;
    at least one second member in alignment with the plurality of first members along the longitudinal axis, the at least one second member comprising a second conductive wire about which a second outer layer is disposed for electric current to flow therethrough relative to the longitudinal axis, the second outer layer comprising a second metal substrate having a first side and an opposite second side, the second outer layer comprising a third copper-graphene (Cu-Gr) multilayer composite disposed on the first side of the second metal substrate and a fourth Cu-Gr multilayer composite disposed on the second side of the second metal substrate, each second conductive wire comprising steel, the at least one second member being disposed together with the plurality of first members along the longitudinal axis defining the cable bundle; and a non-conductive layer disposed about the cable bundle to define the conductive cable.

15. The conductive cable of claim 14 wherein each of the first and second metal substrates has a thickness of between 5 microns and 25 microns, and wherein each of the first and second metal substrates comprises one of copper, aluminum, carbon steel and stainless steel.

16. The conductive cable of claim 14 wherein each of the first, second, third, and fourth Cu-Gr multilayer composites comprises at least two Cu-Gr layers, and wherein each Cu-Gr layer comprises copper and graphene and has a thickness of between 0.1 micron and 0.5 micron.

17. The conductive cable of claim 14 wherein each of the each of the first, second, third, and fourth Cu-Gr multilayer composites has a thickness of between 0.2 micron to 200 micron, and wherein each of the first, second, third, and fourth Cu-Gr multilayer composites has a graphene volume fraction of 0.002% to 0.2%.

18. The conductive cable of claim 14 wherein each of the first and second Cu-Gr multilayer composites comprises at least two Cu-Gr layers, and wherein each Cu-Gr layer comprises copper and graphene and has a thickness of between 0.1 micron and 0.5 micron.

19. The conductive cable of claim 14 wherein each of the each of the first and second Cu-Gr multilayer composites has a thickness of between 0.2 micron to greater than 200 microns, and wherein each of the first and second Cu-Gr multilayer composites has a graphene volume fraction of 0.002% to 3%.

20. A conductive cable for a battery electric vehicle, the conductive cable comprising:

a plurality of first members in alignment to define a longitudinal axis of the conductive cable, each first member comprising a first conductive wire about which a first outer layer is disposed for electric current to flow therethrough relative to the longitudinal axis, the first outer layer comprising a first copper-graphene (Cu-Gr) multilayer composite, each first conductive wire comprising a first metallic material, the plurality of first members being disposed together along the longitudinal axis;

at least one second member in alignment with the plurality of first members along the longitudinal axis, the at least one second member comprising a second conductive wire about which a second outer layer is disposed for electric current to flow therethrough relative to the longitudinal axis, the second outer layer comprising a second copper-graphene (Cu-Gr) multilayer composite, each second conductive wire comprising one of copper, aluminum, and steel, the at least one second member being disposed together with the plurality of first members along the longitudinal axis defining a cable bundle; and a non-conductive layer disposed about the cable bundle to define the conductive cable.

* * * * *